United States Patent

Moran et al.

[15] 3,663,267
[45] May 16, 1972

[54] ARTICLE COATED WITH INTUMESCENT UNDERCOAT OF A SYNTHETIC RESIN, INORGANIC FOAM FORMING AGENT AND CARBON FORMING AGENT AND WATER-INSOLUBLE ORGANIC SOLVENT BASED RESIN OVERCOAT

[72] Inventors: William F. Moran, Randallstown; Lucian C. Kyrias, Baltimore, both of Md.

[73] Assignee: Beatrice Foods Co., Chicago, Ill.

[22] Filed: Sept. 9, 1970

[21] Appl. No.: 70,725

Related U.S. Application Data

[63] Continuation of Ser. No. 680,343, Nov. 3, 1967, abandoned.

[52] U.S. Cl. ............................117/76 P, 117/72, 117/136, 260/6, 260/7, 260/7.5, 260/8, 260/17.2, 260/17.3, 260/17.4
[51] Int. Cl. ..................B44d 1/14, C08g 37/32, C08g 51/14
[58] Field of Search ......................260/8, 6, 7.5; 117/76, 7.5, 117/72, 137, 136

[56] References Cited

UNITED STATES PATENTS

| | | | |
|---|---|---|---|
| 1,852,998 | 4/1932 | Ellis | 117/137 |
| 2,452,054 | 10/1948 | Jones et al. | 117/137 |
| 2,523,626 | 9/1950 | Jones et al. | 260/6 |
| 2,600,455 | 6/1952 | Wilson et al. | 260/6 |
| 2,606,131 | 8/1952 | Aiken et al. | 117/137 |
| 2,813,046 | 11/1957 | Lauring | 117/137 |
| 2,881,088 | 4/1959 | Schulenburg | 260/8 |
| 2,938,937 | 5/1960 | Shenk | 117/137 |
| 3,312,565 | 4/1967 | Rayner et al. | 117/72 |

OTHER PUBLICATIONS

" Paint Additives," Preuss, Metal Finishing, Mar. 1967. pg. 56–59.

*Primary Examiner*—William H. Short
*Assistant Examiner*—Edward Woodberry
*Attorney*—Cushman, Darby & Cushman

[57] ABSTRACT

An article having a fire resistant coating which includes an intumescent undercoat of an aqueous mixture of a synthetic resin, an inorganic foam forming agent and a carbon forming agent. Over the intumescent undercoat there is applied a nonflammable water-insoluble organic solvent based resin. This latter overcoat is essentially incompatible with the intumescent undercoat composition.

6 Claims, No Drawings

ARTICLE COATED WITH INTUMESCENT UNDERCOAT OF A SYNTHETIC RESIN, INORGANIC FOAM FORMING AGENT AND CARBON FORMING AGENT AND WATER-INSOLUBLE ORGANIC SOLVENT BASED RESIN OVERCOAT

This is a continuation of application Serial No. 680,343 filed Nov. 3, 1967, now abandoned.

This invention relates to an improved fire retarding coating system and more particularly to a coating system which includes as an undercoat to be applied to a surface to be protected, an intumescent coating composition and as an overcoat to be applied to said intumescent coating composition, a nonflammable coating material which is essentially incompatible with said intumescent coating composition.

Heretofore, efforts directed to improve the resistance of organic coatings to fire have resulted in adding intumescing agents thereto since one of the most important characteristics of a fire retardant organic coating is intumescence. This is the property of swelling or puffing when exposed to extreme heat or a flame. Gases are given off when the organic coating is exposed to the heat or flame and are trapped by the carbonaceous structure to form a cellular insulating layer between the fire, flame or extreme heat and the substrate. It has been found, however, that organic coatings containing water dispersible latices together with intumescing agents, while initially providing satisfactory fire retardant properties lose their effectiveness on scrubbing or washing. Efforts to provide a washable fire retardant coating composition have resulted, for instance, in a two coat system which requires that the overcoat and undercoat be compatible. Such a system has been found disadvantageous because of the tendency of the overcoat, being compatible with the undercoat, to soften the latter or to become integral therewith, thereby permitting migration of the intumescing agents to the overcoat when the same is applied to the undercoat. Consequently, on washing or scrubbing the overcoat, a portion of the intumescing agents are removed from the coating system.

It has now been found that these disadvantages can be avoided and an improved fire retarding coating system produced when the undercoat and overcoat compositions are essentially incompatible.

It is therefore an object of the present invention to provide an improved fire protective or retardant coating system essentially composed of an intumescent coating composition applied to a substrate and an essentially nonflammable coating composition applied to the intumescent coating composition, said coating compositions being mutually substantially incompatible.

Another object of the present invention is to provide a fire retardant coating system wherein the overcoat composition is washable without any appreciable loss of fire retardant properties of the coating system and which can provide a semigloss or high gloss finish, as desired.

With the foregoing objects in view, as well as others which will become apparent as the description proceeds, the invention consists in a two coat fire protective composition system in which the intumescent coating composition applied to the substrate is an aqueous mixture of a synthetic resin having incorporated therein an inorganic foam forming agent and a carbon forming agent.

Synthetic resins which can be usefully employed in the undercoat composition of the present invention include urea formaldehyde resins, polyvinyl chloride, neoprene, polyvinyl acetate, polyacrylate, polystyrene, copolymers of styrene and butadiene, copolymers of vinylidene chloride and acrylonitrile, copolymers of butadiene and acrylonitrile, copolymers of styrene and acrylonitrile and their mixtures. The synthetic resin can be present in the aqueous mixture in amounts ranging from 5 to 20, preferably 10 to 15, based on the total weight of the mixture.

The inorganic foam forming agent present in the aqueous mixture comprising the undercoat composition can include, for instance, mono-ammonium phosphate, diammonium phosphate, phosphoric acid, ammonium sulfate, sulfamic acid, ammonium sulfamate, ammonium bromide, sodium tungstate, sodium borate, boric acid, carbamic phosphoric acid, vermiculite and their mixtures. The foam forming agent is present in the aqueous mixture in amounts ranging from 25 to 40, preferably 25 to 35 weight percent of the total mixture.

Conventional carbon forming agents suitably used in the aqueous mixture include, for instance, casein, starch, modified starch, isano oil, gum tragacanth, gum arabic, Irish moss and the like, as well as their mixtures. The carbon forming agent is present in amounts between about 5 to 20 and preferably 10 to 20 weight percent, based on the total mixture.

In addition to the above components, the aqueous mixture can also include diluents or inert fillers, pigments, wetting agents, emulsifiers, plasticizers and the like.

The nonflammable coating applied to the intumescent coating composition is an organic solvent based chlorinated rubber or synthetic resin and is essentially incompatible with the intumescent undercoating composition. Usefully employed are the medium-oil alkyds, the long-oil alkyds and the very long oil alkyds. Preferably halogenated alkyds, especially chlorinated alkyds (60 percent) are employed in amounts ranging from 15 to 35 of the total overcoat composition. The alkyds can have incorporated therein polyhydric alcohols such as glycerol, pentaerythritol, di-pentaerythritol and the like to increase the viscosity of the composition as well as to improve its drying characteristics. Additionally, the inclusion of polyhydric alcohols in the overcoating composition improves its water resistance, gloss and gloss retention characteristics and the composition shows balanced hardness and flexibility properties. Polyhydric alcohols can be present in amounts of about 2 to 6 weight percent of the total composition.

Blending agents such as urea and melamine resins as well as chlorinated rubbers which aid in improving color and color retention, durability, gloss and gloss retention characteristics can also be included in the overcoat composition and generally will be present, when used, in amounts of about 15 to 35 percent by weight of the total.

Commercial driers and metallic soaps are also incorporated into the alkyd resin overcoat composition and can include, for instance, Al, Ba, Ca, Cu, Co, Fe, Pb, Li, Mg, Mn, Zn and Fn stearates, naphthenates, tallates, 2-ethylhexoates, linoleates, palmitates and oleates. Preferably employed is aluminum stearate. The driers are generally present in amounts of about 1 to 2 weight percent of the total.

Also included in the overcoating composition are hydrocarbon thinners including mineral spirits, a highly refined distillate of petroleum boiling in the range of about 300° to 385° F as well as pigments and inert fillers in conventionally employed amounts. Such pigment materials and other solid components include titanium dioxide, antimony oxide, sodium metaphosphate, calcium carbonate, antimony silico oxide, zinc oxide and the like. Ordinarily the pigment will be present in amounts ranging from about 35 to 65 weight percent of the total overcoating composition.

The fire retardant surface coating system of this invention can be applied to surfaces that are inherently flammable such as paper, cardboard, wood, fibrous wall board and the like as well as to nonflammable surfaces such as metal, plasterboard and similar materials. The undercoat and overcoat composition can be applied by brush, spraying, rolling or the like, each coat having a thickness up to about 3 to 4 mils or greater if desired. Multiple coats of each coating composition can be applied, as desired. Generally the overcoat composition is not applied to the intumescent undercoat composition until the latter has thoroughly dried, which in most instances will be about 1 to 2 hours after its application to the substrate to be protected. While the overcoat composition can be applied in various thicknesses, it has been found that ordinarily 1 to 2 mils is sufficient to seal the intumescent gases produced in the undercoat composition. Surprisingly, it has also been found that the organic solvent based overcoat has sufficient adhesion to the aqueous based undercoat to prevent delamination but remain a film over the intumescent undercoat when the coated substrate is exposed to heat or flame. This film of outercoat composition has also been found to be sufficiently impervious to the gases generated by heat in the undercoat to provide improved intumescent properties. Because of the incompatibility of the two coatings there is also a substantial reduction of fast flame spread or direct heat transference in the coating system.

The following examples are given as specific illustrations of the present invention but are not to be interpreted in a limiting sense.

Intumescent Undercoat Compositions:

EXAMPLE I

| | Parts by weight |
|---|---|
| Potassium tripolyphosphate | 3 |
| Melamine | 80 |
| Ammonium Polyphosphate | 260 |
| Dipentaerythritol | 75 |
| Chlorinated Paraffin | 40 |
| Polyvinyl Acetate Emulsion | 220 |
| Water and Wetting Agents | 400 |

EXAMPLE II

| | |
|---|---|
| Water | 152 |
| Starch | 3 |
| Urea | 10 |
| Urea Formaldehyde (100%) | 20 |
| Titanium Dioxide | 100 |
| Calcium Carbonate | 25 |
| Mono Ammonium Phosphate | 90 |
| Styrene-Butadiene Latex | 3 |
| Wetting Agents and Thickeners | 72 |

EXAMPLE III

| | |
|---|---|
| Triethyl Phosphate | 20 |
| Urea Formaldehyde Resin | 12 |
| Titanium Dioxide | 7 |
| Water | 5 |
| Polyvinyl Acetate Homopolymer | 62 |

EXAMPLE IV

| | |
|---|---|
| Mono Ammonium Phosphate | 75 |
| Pentaerythritol | 10 |
| Titanium Dioxide | 14 |
| Sodium Alginate | trace |
| Water | 50 |
| Polyvinyl Chloride Homopolymer | 19 |
| Diphenyl Phosphate | 3 |

EXAMPLE V

| | |
|---|---|
| Mono Ammonium Phosphate | 60 |
| Boric Acid | 2 |
| Corn Starch | 7 |
| Titanium Dioxide | 5 |
| Calcium Carbonate | 10 |
| Urea | 9 |
| Paraformaldehyde | 15 |
| Styrene-Butadiene Latex | 18 |

Nonflammable Overcoat Compositions:

EXAMPLE VI

| | Parts by weight |
|---|---|
| Titanium Dioxide | 350 |
| Extended Titanium Dioxide | 678 |
| Antimony Oxide | 178 |
| Chlorinated Alkyd (60%) (Chlorendic Anhydride Type) | 809 |
| Driers | 15 |
| Mineral Spirits | 190 |

EXAMPLE VII

| | |
|---|---|
| Sodium Metaphosphate | 50 |
| Dipentaerythritol | 30 |
| Melamine | 20 |
| Titanium Dioxide | 10 |
| Halogenated Alkyd Resin | 40 |
| Mineral Spirits or other Thinner | 53 |
| Driers | 1 |

EXAMPLE VIII

| | |
|---|---|
| Calcium Carbonate | 20 |
| Titanium Dioxide | 20 |
| Antimony Oxide | 10 |
| Aluminum Stearate | 2 |
| Halogenated Alkyd | 45 |
| Thinners | 15 |
| Driers | 2 |

EXAMPLE IX

| | |
|---|---|
| Titanium Dioxide | 23 |
| Calcium Carbonate | 34 |
| Antimony Silico Oxide | 10 |
| Aluminum Stearate | 2 |
| Chlorinated Alkyd | 38 |
| Chlorinated Paraffin | 7 |
| Thinners | 18 |
| Driers | 1 |

We claim:

1. A method for protecting an article against fire which comprises applying to the surface of said article an undercoating material consisting essentially of an aqueous mixture of a synthetic resin consisting essentially of a member selected from the group consisting of urea-formaldehyde, polyvinyl chloride, neoprene, polyvinyl acetate, polyacrylate, polystyrene, copolymer of styrene and butadiene, copolymer of vinylidene chloride and acrylonitrile, copolymer of butadiene and acrylonitrile, copolymer of styrene and acrylonitrile and their mixtures, said synthetic resin being present in amounts of 5-20 weight percent of said mixture, an inorganic foam forming agent consisting essentially of a member selected from the group consisting of mono-ammonium phosphate, di-ammonium phosphate, phosphoric acid, ammonium sulfate, sulfamic acid, ammonium sulfamate, ammonium bromide, sodium tungstate, sodium borate, boric acid, carbamic phosphoric acid, vermiculite and their mixtures, said foam forming agent being present in amounts of 25 to 40 weight percent of said mixture and a carbon forming agent consisting essentially of a member selected from the group consisting of casein, starch, isano oil, gum tragacanth, gum arabic, Irish moss and their mixtures, said carbon forming agent being present in amounts of 5-20 weight percent of said mixture and applying over said undercoating material a water-insoluble overcoating material consisting essentially of an organic solvent based resin which is essentially incompatible with said undercoating material, said organic solvent based resin consisting essentially of a member selected from the group consisting of chlorinated rubber and alkyd resin selected from the group consisting of medium-oil alkyd resin, long-oil alkyd resin, very long oil alkyd resin and chlorinated alkyd resin containing 60 percent chlorine, said organic solvent based resin being present in amounts of 15-35 weight percent of said overcoating material.

2. The method of claim 1 wherein mineral spirits or a refined distillate of petroleum boiling in the range of about 300°-385°F. is admixed with said organic based resin.

3. The method of claim 1 wherein a pigment is present in said overcoating material in amounts of about 35 to 65 weight percent of said overcoating material.

4. An article having thereon a fire resistant intumescent undercoat formed from an undercoating material comprising an aqueous mixture of a synthetic resin consisting essentially of a member selected from the group consisting of urea formaldehyde, polyvinyl chloride, neoprene, polyvinyl acetate, polyacrylate, polystyrene, copolymer of styrene and butadiene, copolymer of vinylidene chloride and acrylonitrile, copolymer of butadiene and acrylonitrile, copolymer of styrene and acrylonitrile and their mixtures, said synthetic resin being present in amounts of 5 – 20 weight percent of said mixture, an inorganic foam forming agent consisting essentially of a member selected from the group consisting of mono-ammonium phosphate, di-ammonium phosphate, phosphoric acid, ammonium sulfate, sulfamic acid, sodium borate, boric acid, carbamic phosphoric acid, vermiculite and their mixtures, said foam forming agent being present in amounts of 25 to 40 weight percent of said mixture and a carbon forming agent consisting essentially of a member selected from the group consisting of casein, starch, isano oil, gum tragacanth, gum arabic, Irish moss and their mixtures, said carbon forming agent being present in amounts of 5 – 20 weight percent of said mixture, and a non-flammable, water-insoluble overcoat applied over said undercoat said water-insoluble overcoat formed from an undercoating material consisting essentially of an organic solvent based resin which is essentially incompatible with said undercoat, said organic solvent based resin consisting essentially of a member selected from the group consisting of chlorinated rubber and alkyd resin selected from the group consisting of medium-oil alkyd resin, long-oil alkyd resin, very long oil alkyd resin and chlorinated alkyd resin containing 60 percent chlorine, said organic solvent based resin being present in amounts of 15 – 35 weight percent of said overcoating material.

5. The article in claim 4 wherein the resin in the overcoat is an alkyd resin or chlorinated rubber.

6. The article in claim 5 wherein the alkyd resin is a halogenated alkyd resin.

* * * * *